United States Patent
Gerszberg et al.

(10) Patent No.: US 7,558,579 B2
(45) Date of Patent: Jul. 7, 2009

(54) METHOD AND SYSTEM FOR PROVIDING ACCESS TO A TELECOMMUNICATIONS NETWORK

(75) Inventors: Irwin Gerszberg, Kendall Park, NJ (US); Jesse E Russell, Piscataway, NJ (US); Robert E Schroeder, Montville, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 715 days.

(21) Appl. No.: 11/155,585

(22) Filed: Jun. 20, 2005

(65) Prior Publication Data
US 2005/0239470 A1    Oct. 27, 2005

Related U.S. Application Data

(63) Continuation of application No. 08/868,407, filed on Jun. 3, 1997, now Pat. No. 7,047,012.

(51) Int. Cl.
*H04Q 7/00*    (2006.01)
(52) U.S. Cl. .................. 455/445; 455/413; 455/426.2; 455/561
(58) Field of Classification Search ... 455/412.1–414.1, 455/415, 422.1, 425, 428, 426.1–426.2, 461–462, 455/560–561, 405, 409, 554.1–557, 445; 379/221.01, 41, 49, 51, 67.1, 88.18, 88.25, 379/201.01
See application file for complete search history.

(56) References Cited

U.S. PATENT DOCUMENTS

| | | | |
|---|---|---|---|
| 4,054,756 A | 10/1977 | Comella et al. |
| 4,763,191 A | 8/1988 | Gordon et al. |
| 4,802,199 A | 1/1989 | Lange et al. |
| 4,821,310 A | 4/1989 | Lynk et al. |
| 5,247,571 A | 9/1993 | Kay et al. |
| 5,307,399 A * | 4/1994 | Dai et al. .................. 455/459 |
| 5,315,637 A | 5/1994 | Breeden et al. |
| 5,329,578 A | 7/1994 | Brennan et al. |
| 5,353,331 A | 10/1994 | Emery et al. |

(Continued)

FOREIGN PATENT DOCUMENTS

CA    2127940    3/1995

(Continued)

OTHER PUBLICATIONS

A first Canadian Office Action (Canadian Patent Application No. 2,231,928) dated Jan. 20, 2000.

(Continued)

*Primary Examiner*—Kamran Afshar
(74) *Attorney, Agent, or Firm*—Zagorin O'Brien Graham LLP

(57) ABSTRACT

A system and a method for connecting a call through a telecommunications network. A base station, connected to a public switched telephone network, includes a call processor, a memory and a transceiver. The memory includes a database containing dialing instructions for a wireless station for a telephone connection through the public switched telephone network to a destination station. The transceiver receives a call request from the wireless station, and the call processor in response to the call request, accesses the database and dials a call for connection through the public switched telephone network to the destination station based on the dialing instructions for the wireless station.

20 Claims, 2 Drawing Sheets

U.S. PATENT DOCUMENTS

| | | | | |
|---|---|---|---|---|
| 5,392,452 | A | * | 2/1995 | Davis ........................ 340/7.3 |
| 5,402,470 | A | | 3/1995 | DeVaney |
| 5,471,519 | A | * | 11/1995 | Howe et al. .............. 379/88.26 |
| 5,475,735 | A | | 12/1995 | Williams et al. |
| 5,504,804 | A | | 4/1996 | Widmark et al. |
| 5,530,945 | A | | 6/1996 | Chavez, Jr. et al. |
| 5,539,817 | A | | 7/1996 | Wilkes |
| 5,555,447 | A | | 9/1996 | Kotzin et al. |
| 5,621,729 | A | | 4/1997 | Johnson et al. |
| 5,689,548 | A | | 11/1997 | Maupin et al. |
| 5,710,805 | A | | 1/1998 | Armbruster et al. |
| 5,745,551 | A | | 4/1998 | Strauch et al. |
| 5,764,747 | A | * | 6/1998 | Yue et al. ............... 379/211.03 |
| 5,839,067 | A | | 11/1998 | Jonsson |
| 5,933,778 | A | | 8/1999 | Buhrmann et al. |
| 6,078,804 | A | | 6/2000 | Alperovich et al. |
| 6,157,846 | A | * | 12/2000 | Manning et al. ............ 455/557 |
| 6,219,539 | B1 | * | 4/2001 | Basu et al. .................. 455/417 |
| 7,047,012 | B1 | * | 5/2006 | Gerszberg et al. ........... 455/445 |

FOREIGN PATENT DOCUMENTS

| | | |
|---|---|---|
| CA | 2221401 | 6/1998 |
| EP | 0462728 | 12/1991 |
| WO | WO9635302 | 11/1996 |
| WO | WO9704615 | 2/1997 |

OTHER PUBLICATIONS

A second Canadian Office Action (Canadian Patent Application No. 2,231,928) dated Apr. 10, 2001.

European Search Report (European Patent Appllication No. 98301494.5) dated Jul. 21, 1999.

Republication of the European Search Report (European Patent Application No. 98301494.5) dated Sep. 1, 1999.

* cited by examiner

METHOD AND SYSTEM FOR PROVIDING ACCESS TO A TELECOMMUNICATIONS NETWORK

This application is a Continuation application of and claims priority to U.S. Ser. No. 08/868,407, filed Jun. 3, 1997 now U.S. Pat. No. 7,047,012, incorporated herein in its entirety.

BACKGROUND OF THE INVENTION

1. Field of the Invention

The present invention relates to the field of telecommunications. More particularly, the present invention relates to a system and a method for establishing a connection through a telecommunications network.

2. Description of the Related Art

In conventional telecommunications systems, a user desiring fast, efficient telecommunications connection service will often lease a dedicated line from a telephone service provider. For example, the rail industry, trucking industry, overnight mail delivery services, FBI, Secret Service, large utility companies along with various federal, state and local government agencies require that wireless telecommunications be rapidly delivered over a large geographical area. Presently, this is done by leasing dedicated lines from base stations to a central switching location.

The expenses for such a leased line are usually paid on an expensive one-time or monthly basis, and may be disproportionate for the actual usage time for the line since the majority of base stations are sporadically used. Often, multiple base stations are connected to one line and these conventional dedicated multi-drop circuits are difficult to reconfigure as the user's requirements change. Additionally, the individual circuit legs of dedicated connections trouble prone with noise, unbalance and are difficult to fault isolate and reroute, tending to prolong service outage(s). Further, there is no network redundancy with dedicated lines because of the high leased facility costs, and expensive maintenance and operation costs. Conventional leased lines also lack inter-networking capability across multi-networks, do not support station mobility (i.e., roaming), and lack enhanced communication features.

Consequently, there is a need for rapid telecommunications connections without the attendant expense and other disadvantages associated with conventional leased lines.

SUMMARY OF THE INVENTION

The present invention provides rapid telecommunications connections without the expense and other disadvantages associated with conventional leased lines. The advantages of the present invention are provided by a system and a method for connecting a call through a telecommunications network. According to the invention, a base station, connected to a public switched telephone network, includes a call processor, a memory and a transceiver. The memory includes a database containing dialing instructions for a wireless station for a telephone connection through the public switched telephone network to a destination station. The transceiver receives a call request from the wireless station, and the call processor in response to the call request, accesses the database and dials a call for connection through the public switched telephone network to the destination station based on the dialing instructions for the wireless station.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides an efficient, low-cost solution for providing a priority line connection telecommunications service that can be quickly established via a public switched telephone network (PSTN) without incurring the high costs associated with a conventional dedicated-line service. The present invention is advantageously used by a telecommunications user for rapidly establishing time-critical connection paths to a destination station while receiving economical usage rates for a PSTN connection. According to the invention, multiple users may use an established connection through the PSTN service to create a time-shared system that rapidly and effectively establishes and drops call connections in accordance with expected user traffic schedules. Additionally, well-known DTMF detection and removal techniques can be used for further enhancing the rapid, telecommunications interconnection service provided by the present invention.

Figure 1:
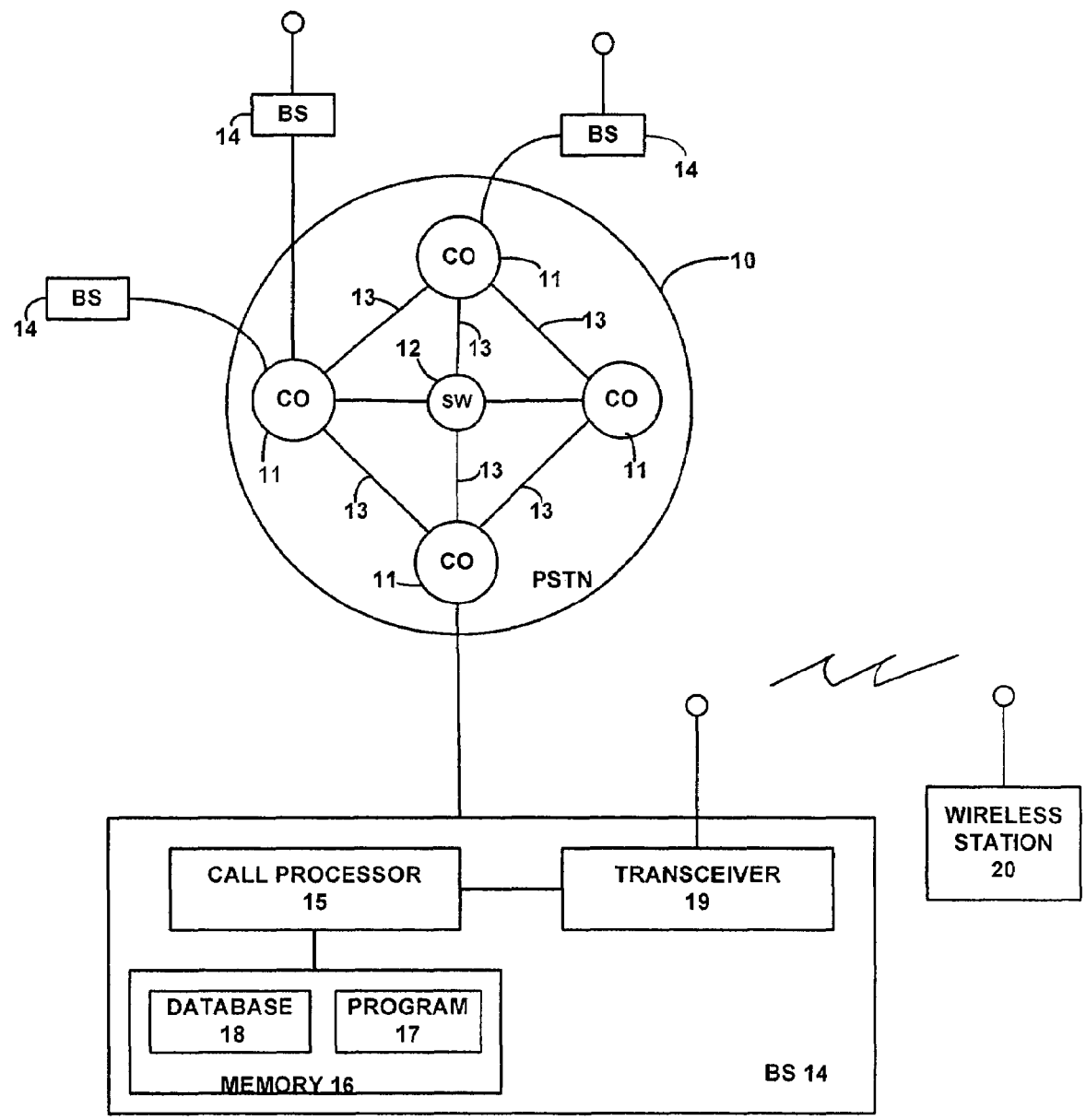
FIG. 1 shows a schematic block diagram of a system for accessing a telecommunications network according to the present invention.

FIG. 1 shows a schematic block diagram of a system for rapidly establishing a connection through a public switched telephone network (PSTN) 10 according to the present invention. PSTN 10 includes a plurality of switches (SW) 11 and central offices (CO) 12 that are interconnected by trunks 13. A plurality of base stations 14 are connected to the central offices in a well-known manner. Base stations 14 communicate in a well-known manner with wireless terminals, of which only wireless terminal 20 is shown. Wireless terminal 20 can be stationary or mobile.

Each base station 14 includes a call processor 15 coupled to a memory 16 and to a transceiver 19. Memory 16 includes a program data space portion 17 where information for call processor 15 is stored, and a memory space portion 18 in which a user database is stored. User database 18 includes information relating to user dialing information for each wireless station 20. User database 18 also includes call routing information for each wireless station 20 to selected destination stations. Call processor 15 performs audio and tone detection, storage, and removal in connection with ISDN and/or POTS line interfacing and digital speech processing. When ISDN service is unavailable, call processor 15 provides a capability for POTS dial up line for voice only and for an X.25 line for a control interface. Transceiver 19 operates in a well-known manner in communicating with mobile station 20.

Figure 2:
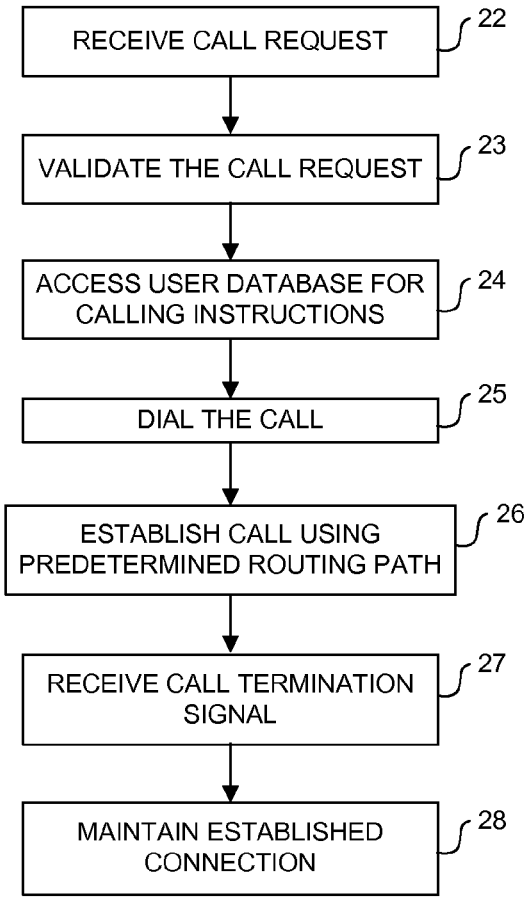
FIG. 2 shows a flow diagram for the operation of a system for accessing a telecommunications network according to the present invention.

FIG. 2 shows a flow diagram for the operation 21 of a system for accessing a telecommunications network according to the present invention. Upon receiving a call request from wireless station 20 that uniquely identifies station 20 at step 22, such as a station identification number, for example, call processor 15 validates the call request at step 23 and accesses user database 18 at step 24 for obtaining dialing instructions associated with wireless station 20. Call processor 15 then dials the destination station at step 25 in accordance with the dialing instructions for the wireless station for establishing a telecommunications connection at step 26, via PSTN 10, to a destination station using a predetermined routing path associated with station 20 and the destination station of the call. Once the call is completed, the connection is disconnected by a termination signal from either wireless station 20 or the destination station at step 27.

Figure 3:
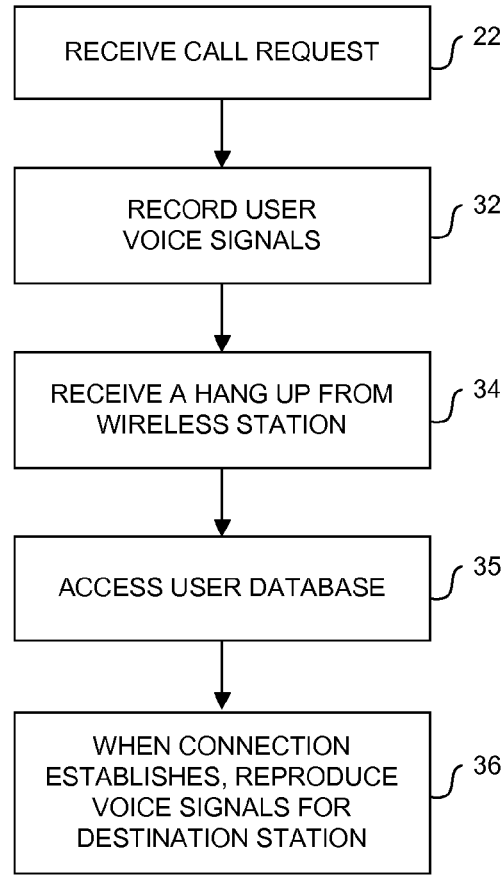
FIG. 3 shows a flow diagram related to storing voice signals, especially for short conversational purposes.
Figure 4:
FIG. 4 shows that the predetermined connection path may be shared.

Referring to FIG. 3, base station 14 also records user voice signals into memory 16 at step 32 so that the user may hang up (step 34) before the connection to the destination station is established, thus reducing waiting time for the user, especially for short conversational purposes. When the connection is established, (step 36) base station 14 then reproduces the voice signals for the destination station. Additionally, referring to FIG. 4, the predetermined connection path may be shared by a plurality of different users on a time-sharing basis where specific time periods are scheduled for each user. The predetermined connection path may be maintained after it is established at step 28, even after user termination signaling, for further enhancing rapid telecommunications connectivity for subsequent calls or scheduled predetermined path connection times in response to daily traffic patterns.

While the present invention has been described in connection with the illustrated embodiments, it will be appreciated and understood that modifications may be made without departing from the true spirit and scope of the invention.

What is claimed is:

1. A method for delivering a message to a destination station from a wireless station comprising the steps of:
   receiving at a call processor at a base station unique station identification data for a destination station from said wireless station;
   receiving and storing at the call processor a message from said wireless station for delivery to said destination station, the call processor performing digital processing;
   accessing a database containing dialing instructions for the wireless station for connecting to the destination station through a predetermined connection path through a public switched telephone network;
   receiving a hang up indication from said wireless station before a connection to the destination station is established; and
   delivering said message to said destination station once the connection is established via the predetermined connection path through the public switched telephone network.

2. The method of claim 1 wherein the message comprises a voice message.

3. The method of claim 2 further comprising storing the voice message prior to the call processor accessing the database.

4. The method of claim 1 wherein the base station reproduces recorded voice signals for the destination station from the message stored at the call processor.

5. The method of claim 1 wherein the predetermined connection path is maintained after receiving the hang up indication.

6. The method of claim 1 wherein the predetermined connection path is shared by a plurality of different users.

7. The method of claim 6 wherein time periods are scheduled for each user of the plurality of different users.

8. A method for delivering a voice message to a destination station from a wireless station comprising the steps of:
   receiving at a call processor at a base station unique station identification data for a destination station from said wireless station;
   receiving and storing at the call processor a voice message from said wireless station for delivery to said destination station;
   accessing a database containing dialing instructions for the wireless station for connecting to the destination station through a predetermined connection path through a public switched telephone network;
   receiving a hang up indication from said wireless station before a connection to the destination station is established; and
   delivering said voice message to said destination station once the connection is established.

9. The method of claim 8 wherein the base station reproduces recorded voice signals for the destination station from the message stored at the call processor.

10. The method of claim 8 wherein the predetermined connection path is maintained after receiving the hang up indication.

11. The method of claim 8 wherein the predetermined connection path is shared by a plurality of different users.

12. The method of claim 8 further comprising storing the voice message prior to the call processor accessing the database.

13. A base station connected to a public switched telephone network, the base station comprising:
   a receiver for receiving at a call processor at the base station unique station identification data for a destination station from a wireless station and a message from the wireless station for delivery to the destination station;
   a memory for storing the message from said wireless station for delivery to the destination station;
   a database containing dialing instructions for the wireless station for connecting to the destination station through a predetermined connection path through a public switched telephone network;
   an input for receiving a hang up indication from the wireless station before a connection to the destination station is established; and
   an output for delivering the message to the destination station once the connection is established.

14. The base station according to claim 13, wherein the connection established for the call is a connection that is time-shared with other wireless stations.

15. The base station of claim 13 wherein the message comprises a voice message.

16. The base station of claim 15 wherein the voice message is stored prior to the call processor accessing the database.

17. The base station of claim 13 wherein the base station reproduces recorded voice signals for the destination station from the message stored at the call processor.

18. The base station of claim 13 wherein the predetermined connection path is maintained after receiving the hang up indication.

19. The base station of claim 13 wherein the predetermined connection path is shared by a plurality of different users.

20. The base station of claim 19 wherein time periods are scheduled for each user of the plurality of different users.

* * * * *